W. R. SAVAGE.
CAMERA SHUTTER.
APPLICATION FILED SEPT. 18, 1912.

1,150,544.

Patented Aug. 17, 1915.
6 SHEETS—SHEET 2.

Witnesses:
M. S. Walker.
A. P. Heggeade

Inventor,
Will R. Savage,
By David O. Barnell,
Attorney.

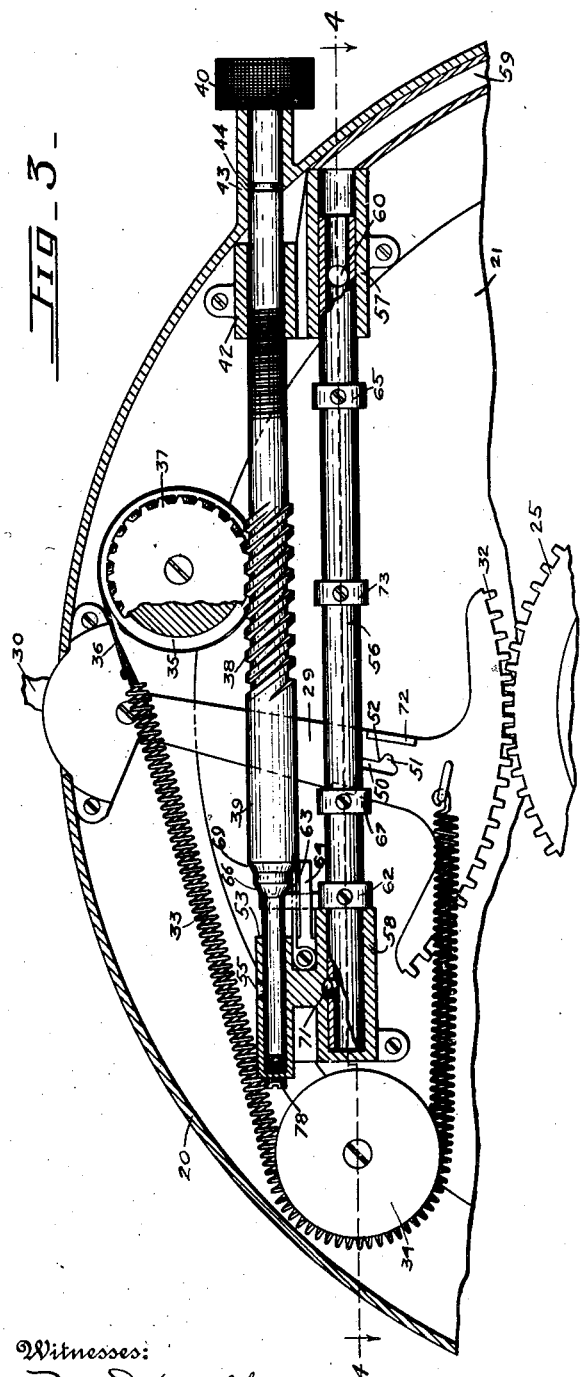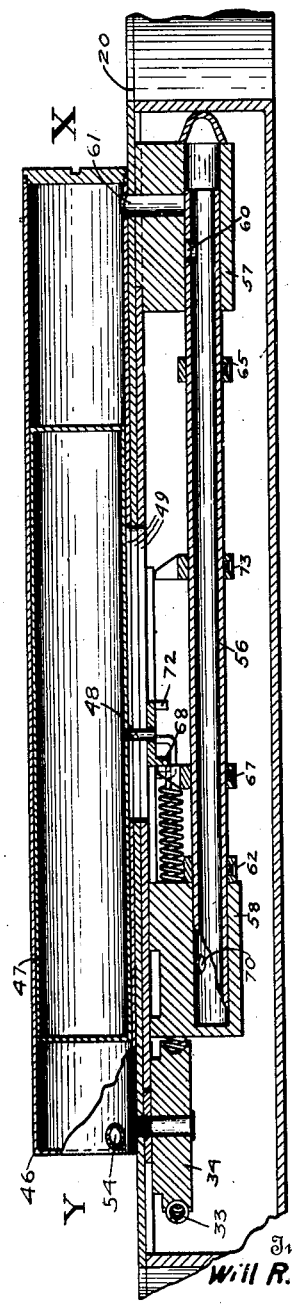

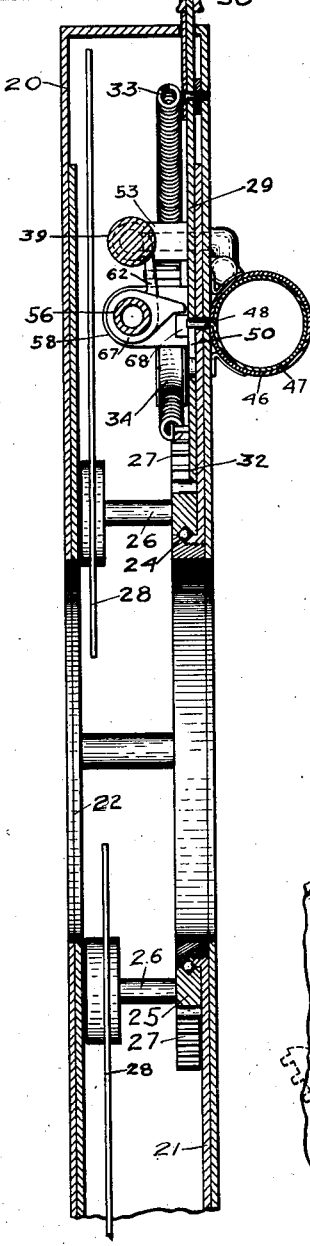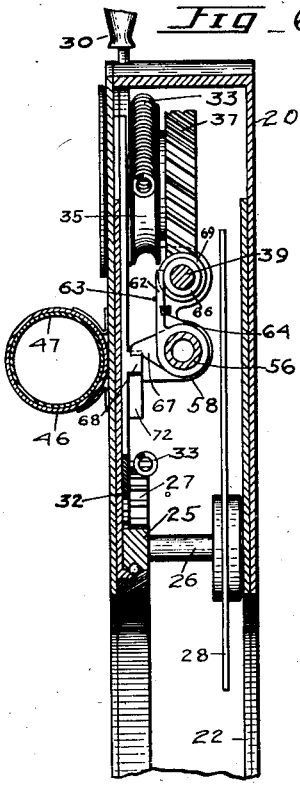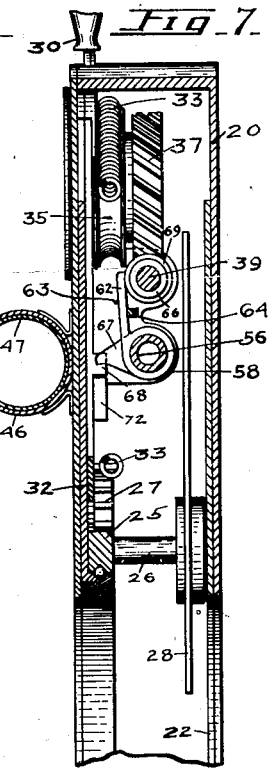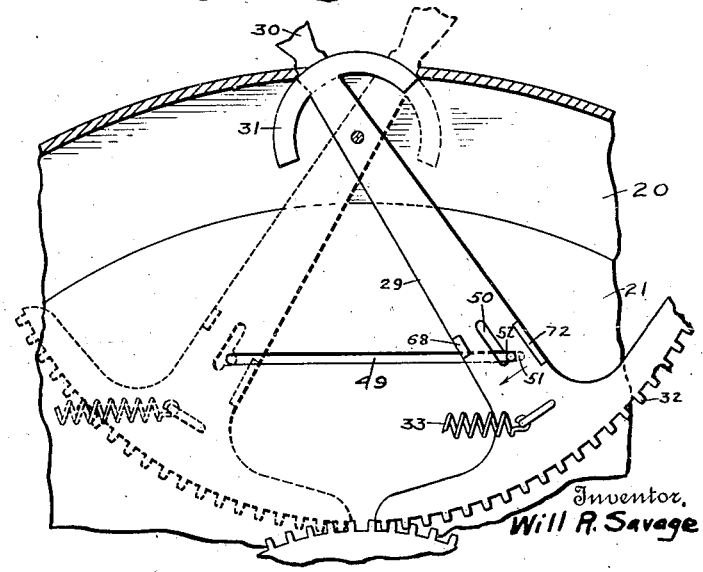

W. R. SAVAGE.
CAMERA SHUTTER.
APPLICATION FILED SEPT. 18, 1912.
1,150,544.
Patented Aug. 17, 1915.
Fig. 9.
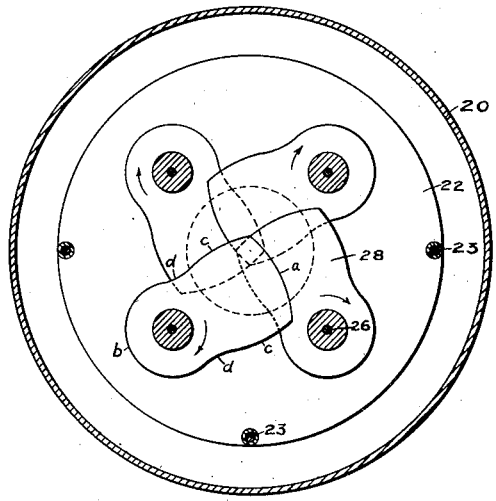
Fig. 11.
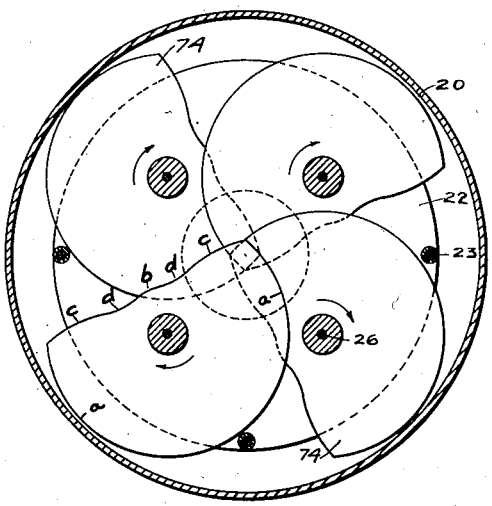
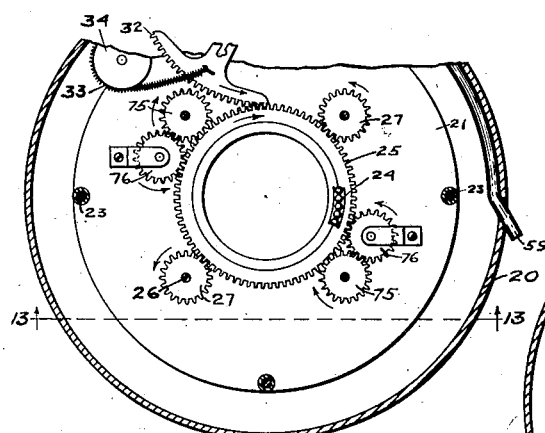
Fig. 12.
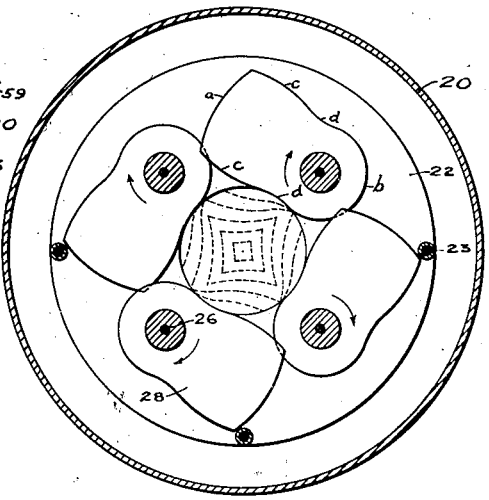
Fig. 10.
Fig. 13.
Inventor.
Will R. Savage,
Witnesses:
M. S. Walker.
A. P. Hegglade
By David O. Barnell,
Attorney.

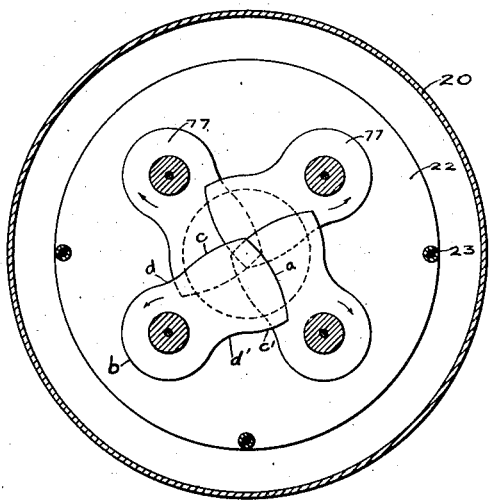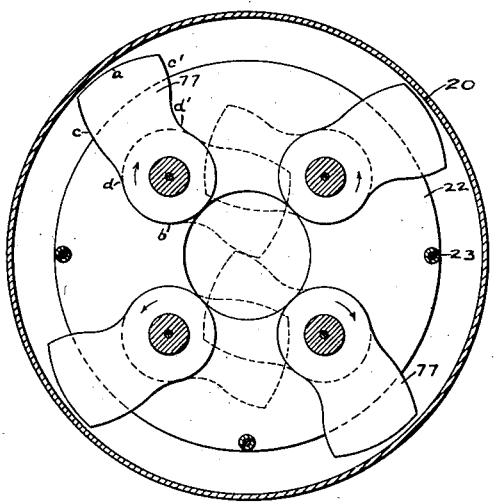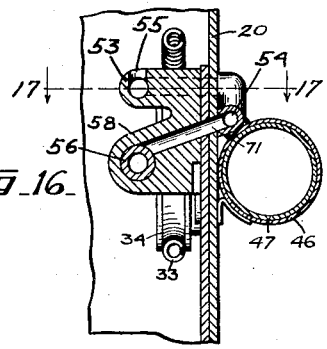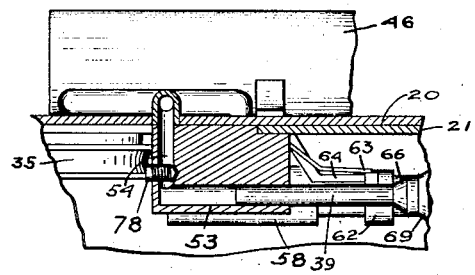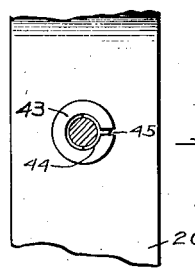

UNITED STATES PATENT OFFICE.

WILL R. SAVAGE, OF OMAHA, NEBRASKA.

CAMERA-SHUTTER.

1,150,544.  Specification of Letters Patent.  Patented Aug. 17, 1915.

Application filed September 18, 1912. Serial No. 721,106.

*To all whom it may concern:*

Be it known that I, WILL R. SAVAGE, a citizen of the United States, and a resident of Omaha, in the county of Douglas and State of Nebraska, have invented certain new and useful Improvements in Camera-Shutters, of which the following is a specification.

My invention relates to camera shutters, and especially to shutters having pivoted wings which open and close an aperture by unidirectional movement.

The objects of my invention are to provide a camera shutter capable of extremely rapid movement so as to enable the making of exposures of a minimum duration; to provide shutter wings of a form such as to give the greatest amount of light transmission through the aperture in proportion to the duration of opening; to provide means for timing or determining automatically the duration of the shutter opening; to provide means for varying the automatic timing means; to provide means for opening and closing the shutter by alternate pneumatic impulses or "bulb action" only; and to provide means for opening the shutter by one pneumatic impulse and closing it by another, as for ordinary "time" exposures.

Constructions embodying my invention are illustrated in the accompanying drawings, in which—

Figure 1:
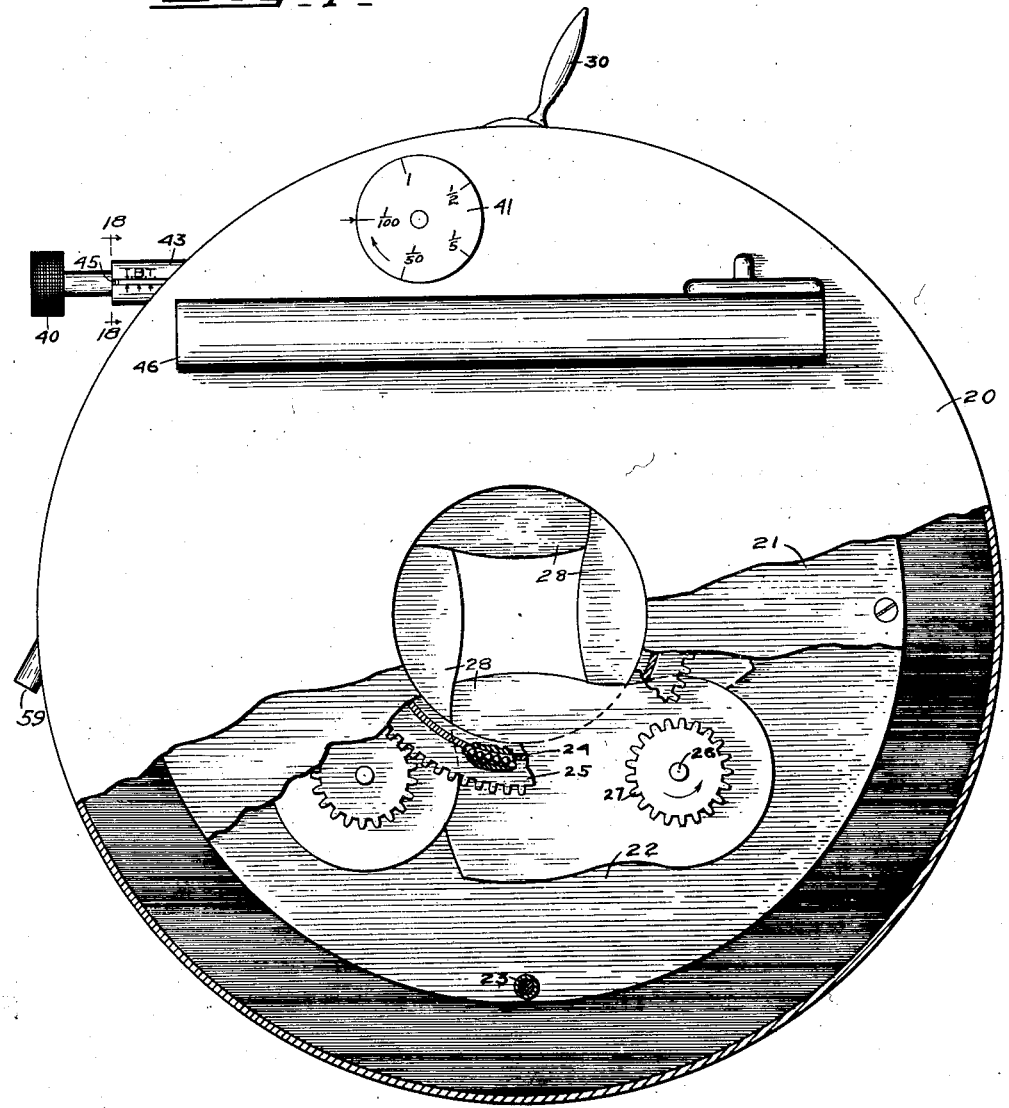
Figure 2:
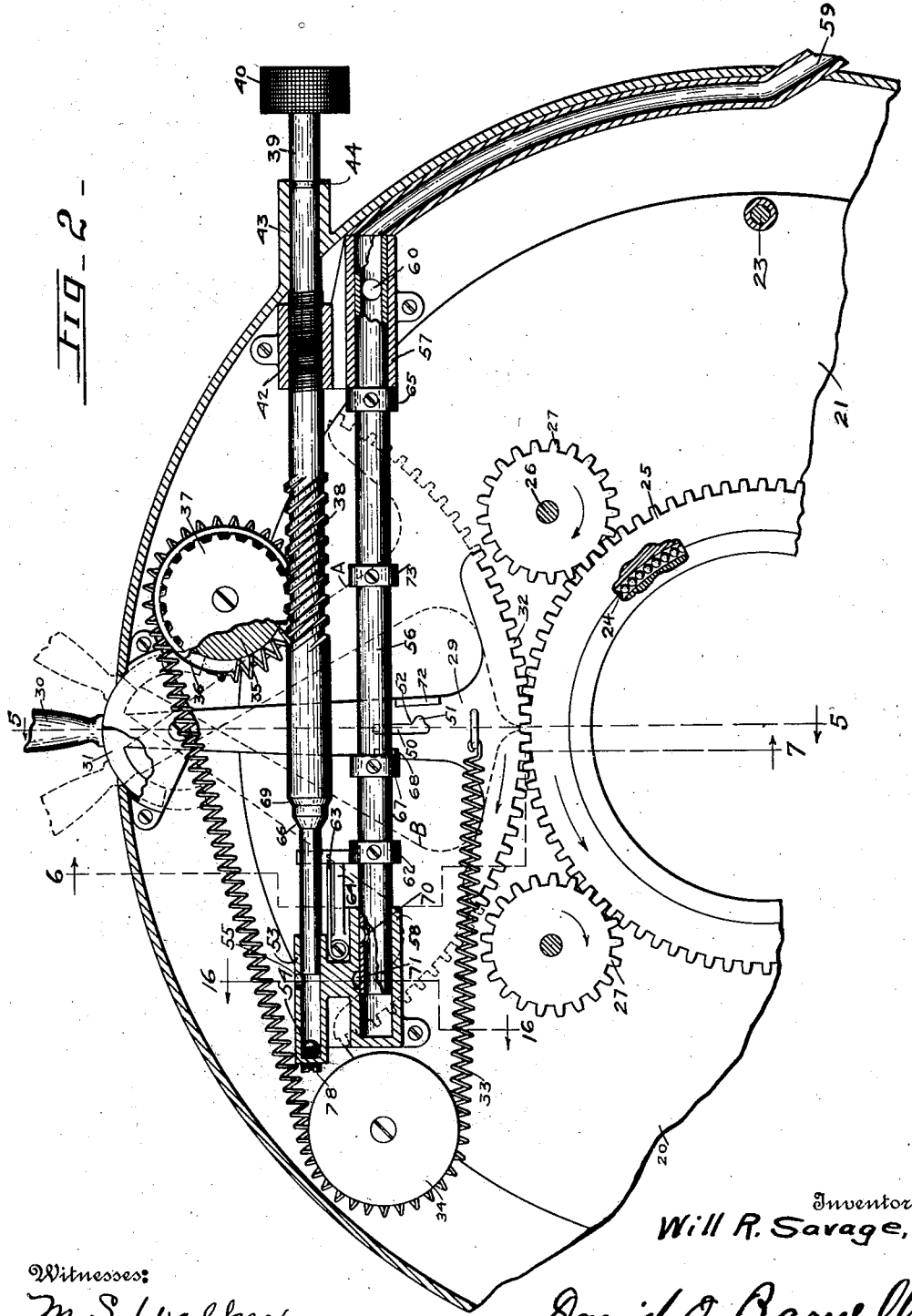

Figure 1 is a front view of the mechanism with portions of the casing and certain other parts broken away to show the underlying portions, Fig. 2 is a detail transverse section of the controlling mechanism, Fig. 3 is a similar view showing the parts at "open" position for time exposures, Fig. 4 is a horizontal section on the plane of the line 4—4 of Fig. 3, Fig. 5 is a vertical section on the line 5—5 of Fig. 2, Figs. 6 and 7 are sectional views taken on the plane of the line 6—7 of Fig. 2, Fig. 8 is a detail of the drive-segment latch device, Figs. 9 and 10 are views illustrating closed and open positions of the normal form of shutter wings, Fig. 11 is a view showing a modified form of shutter wings, Fig. 12 is a view of the drive mechanism as arranged for reversed wing motion, Fig. 13 is a detail section on the plane of the line 13—13 of Fig. 12, Figs. 14 and 15 are views showing different positions of the reverse-motion type of wings, Fig. 16 is a detail section on the plane of the line 16—16 of Fig. 2, Fig. 17 is a detail section on the plane of the line 17—17 of Fig. 16, and Fig. 18 is a detail section on the plane of the line 18—18 of Fig. 1.

In carrying out my invention I provide a substantially cylindrical casing 20, having through the center thereof a circular aperture, which is disposed concentrically with the axis of the lens with which the shutter is used. The front side of the casing is removably secured to the body thereof so as to form in effect a cover therefor. To said cover is secured the frame which carries the shutter mechanism, said frame comprising a front-plate 21, back-plate 22, and posts 23 by which said plates are held in spaced relation to each other. The plates 21 and 22 have central apertures corresponding to the aperture of the casing. Around the aperture of the plate 21 is disposed a ball-bearing 24 which supports an annular gear 25. Arbors 26 are journaled in the plates 21 and 22, said arbors being spaced equidistantly from each other and at equal distances radially from the center of the aperture. On said arbors are pinions 27 which mesh with the annular gear 25, so that by rotation of said gear the pinions and arbors are revolved. The shutter wings 28 are secured to the arbors, the normal or usual form of the wings being shown in Figs. 1, 9 and 10. The pinions 27 are all of the same size so that the rotative movements of all of the arbors and wings are uniform in amount and direction, and the wings are arranged on the arbors so that at any time all of the wings are in the same relation to the aperture.

Near the upper part of the casing is pivotally mounted an arm 29 of which the upper end extends through a slot in the side of the casing to form a handle 30. An arcuate plate 31 is carried by the arm and extends into the slot in the casing so as to exclude dust and the like which might enter through the slot were it left open. At the lower end of the arm is a gear-segment 32 which meshes with the annular gear 25, the extent of movement permitted to the segment being such that it may revolve the annular gear sufficiently to cause one complete revolution of the pinions and wing-arbors. A helical spring 33 has one end connected with the arm 29 and extends laterally outward therefrom, passing around a sheave-pulley 34 journaled on the frame as shown, and thence extends inwardly and upwardly toward a second sheave-pulley 35. The other end of said spring is connected with a flexible cord or band 36 which passes once or more around the pulley 35 and is then secured thereto. The tension of the spring 33 may be varied by rotating the pulley 35 so as to wind the band 36 and a part of the spring around the same. The pulley 35 is rotated by means of a worm-gear 37 which is secured on the side of the pulley and meshes with a worm 38 formed on a transverse shaft 39. Said shaft is journaled in the frame, as shown, and extends through the side of the casing, being provided at its outer end with a knurled head 40 by which it may be turned.

The shaft on which the pulley 35 and worm-gear 37 are mounted is extended through the front of the casing and carries a disk 41 which is graduated as shown to indicate different automatically-timed exposure durations to which it may be desired to adjust the shutter mechanism. A part of the shaft 39 is threaded and is screwed through the bearing 42 therefor, so that as the shaft is revolved it will also have a slight longitudinal movement, and in the structure shown the direction of the threads and of the worm 38 are such that the shaft will move inwardly when it is turned in such a direction as to reduce the tension on the spring 33, and will move outwardly when it is turned in such a direction as to increase the tension of the spring 33 by the appropriate movement of the pulley 35. The sleeve 43 on the casing, through which the outer part of the shaft 39 extends, has a longitudinal slot therein, and in the shaft adjoining the slot is an annular groove in which is disposed a semi-annular rider 44 having a pointer 45 extending into the slot in the sleeve, as shown in Figs. 1 and 18. The front side of the sleeve 43 is graduated as shown in Fig. 1, so that coincidence of the pointer with said graduations may indicate certain longitudinal variations in the position of the worm-shaft 39. As before noted, the shaft moves longitudinally outward when the worm and worm-wheel are turned so as to increase the tension of the spring 33, and thus when the shaft is at the extreme outward position shown in Figs. 1 and 2 the spring 33 will be at its greatest tension. The spring 33 serves to actuate the shutter mechanism in the making of automatically-timed exposures and the variations of timing are controlled in part by variations in the tension of the spring. The shutter is set for the making of an exposure, by moving the handle 30 to the right when viewed as in Fig. 1, or to the left when viewed as in Figs. 2, 3 and 8, said movement placing the arm 29 and gear-segment 32 in the position shown by full lines in Fig. 8 and by the dotted lines A in Fig. 2. The arm 29 is retained in the "set" position by the following means: On the front of the casing is a cylinder 46 within which is slidably disposed a piston 47. On the side of said piston is a pin 48 which extends through coincident slots 49 made in the side of the cylinder, in the casing 1, and in the plate 21, as shown in Figs. 4 and 5. The end of the pin 48 extends into a longitudinal slot 50 formed in the arm 29, and at one side of said slot 50 near the lower end thereof is a notch 51. The pin 48 thus connects the piston and the arm 29 so that their movements must, in general, correspond with each other. Now, when the arm 29 is moved to the position shown in Fig. 8, it carries the piston toward the end X of the piston 46, the pin 48 being engaged by the straight side of the slot 50. After the piston has been so moved, a slight movement of the arm in the direction of the arrow in Fig. 8 may occur without causing movement of the piston, since the pin 48 will pass into the notch 51 at the opposite side of the slot, as indicated in Fig. 8. When in this position the pressure of the arm upon the pin, caused by the tension of the spring 33, will be exerted by the shoulder 52 at the upper side of the notch and in a downwardly inclined direction. This direction not being coincident with the direction of the slot 49 through which the pin moves, it will be obvious that the arm will be held in the said position until the piston and pin 48 are moved slightly toward the end Y of the cylinder 46, so as to displace the pin from the notch 51. The piston may be so actuated by the means hereinafter described, and the force which must be exerted upon the piston in order to displace the pin from the notch will depend upon the angle between the shoulder 52 and the axis of the slot 50. When the piston is moved sufficiently to displace the pin 48 from the shoulder, the spring 33 will swing the arm rapidly to the position shown by dotted lines B in Figs. 2 and 8, and such movement of the arm and gear-segment will actuate the annular gear, the wing-arbors and the wings, so as to first open and then close the aperture, by continuous unidirectional movement of the parts. The speed with which this movement is made determines the duration of the exposure, and said speed is determined in part, as before mentioned, by the degree of tension in the spring 33. A further regulation of the speed of the shutter movement is obtained, however, by the following means: The inner end of the shaft 39 is reduced in diameter and fits slidably within a cylindrical barrel 53 of which the end opposite that entered by the shaft is connected by means of a port 54 with the end Y of the cylinder 46. In the side of the barrel 53 is a vent 55 which, when the shaft 39 is at the extreme outer position shown in Fig. 2, is fully open, but which is closed more or less by the movement of the shaft inwardly. Thus when the spring 33 is at the greatest tension the escape of air from the end Y of the cylinder is but little retarded, having a free escape through the port 54 and vent 55, and the movement of the shutter is made at a maximum speed. When the worm-shaft is turned to lower the tension of the spring 33 it also moves longitudinally and reduces the effective area of the vent 55, so that the speed of the shutter movement is reduced both by the reduction of the actuating force of the spring 33 and by the retardation of escape of air from the end Y of the pneumatic cylinder. For some purposes it may be desirable to reduce the effective area of the port 54 by means of a screw 78 arranged to intersect the port, as shown in Fig. 17. For the slowest automatic timing of the shutter movement the vent 55 is entirely closed and the air confined in the end Y of the cylinder escapes only by leakage past the piston and around the reduced end of the shaft 39 in the barrel 53.

After the vent 55 is closed by the inward movement of the worm-shaft, continued rotation of the shaft in the same direction so relaxes the tension on the spring 33 that it will exert little if any pull upon the arm 29. At about the time that the tension of the spring is completely relaxed the character of the shutter operation is changed from the automatic timing to the "bulb" action, or that in which the shutter is caused to be opened by pneumatic pressure, as from a bulb, and remains open until the bulb is released and the air drawn back into the same. This change in the character of the shutter operation is effected by the following means: Below the worm-shaft and parallel thereto is a tubular shaft 56 of which the ends are slidably and rotatably supported in bearings 57 and 58 disposed, respectively, below the threaded bearing 42 and the barrel 53. The outer end of the bearing 57 is connected with a tube 59 which is extended through the side of the casing 20 and is connected with a rubber bulb or other suitable device for supplying a small quantity of air under pressure. In the side of that portion of the tube within the bearing 57 is a port 60 which normally registers with a port 61 connecting with the end X of the cylinder 46, the air for moving the piston away from said end of the cylinder always being supplied through said passage. Near the bearing 58 an arm 62 is secured to the tubular shaft 56 and, extending upwardly therefrom, engages the side of the worm-shaft, being held against the same by means of a spring 63. One side of the arm 62 rests normally against the end of a finger 64 which prevents longitudinal movement of the tube 56 toward the bearing 58, while a collar 65 engages the bearing 57, as shown, to prevent longitudinal movement of the tube in the other direction. When the worm-shaft is moved inwardly, as before described, a conical portion 66 engages the arm 62 and pushes the same aside so that the tube 56 is slightly rotated. On the central portion of the tube 56 is secured an arm 67 which, when the tube is rotated as above described, moves from the position shown in Fig. 5 to the position shown in Fig. 6. At the latter position the said arm is engageable by a lug 68 on the arm 29 and limits the movement of the arm so that when the same is released from the "set" position, shown by the dotted lines A in Fig. 2, it can move only to the central position shown by the full lines in said figure. When the arm and the gear-segment 32 move to the latter position the shutter wings are moved so as to fully open the aperture, and the arm and segment are actuated by the pneumatic pressure in the end X of the cylinder 46, supplied thereto as before described. After the shutter is moved to the open position, as described, it may be returned to the closed position or "set" position by withdrawing the air from the end X of the cylinder, as by releasing the pressure upon the bulb employed to cause the first pressure therein. Said pressure being released, the piston is returned to the initial position by the pressure of the air confined in the end Y of the cylinder.

If the worm-shaft be turned so as to move still farther inward from the "bulb" position, the arm 62 is engaged by a second conical portion 69 on the shaft, and a further rotative movement is given to the tubular shaft 56. The movement of the arm 62 carries it to a position such that it can pass beneath the finger 64, as shown in Fig. 7, and thus permit longitudinal movement of the tubular shaft. After the arm has been turned as described, air pressure in the end X of the cylinder 46 will move the arm 29 and the gear segment will be actuated as before so as to open the shutter. The lug 68 will also engage the arm 67 when the arm reaches the central position, but instead of being stopped thereby it will move the tubular shaft 56 longitudinally from the position shown in Fig. 2 to the position shown in Figs. 3 and 4. When at this position a port 70 in the tubular shaft 56 is brought into coincidence with a port 71 which extends through the bearing 58 and connects with the port 54 leading to the end Y of the cylinder. At the same time, the ports 60 and 61 pass out of register, so that a connection from the tube 59 is established through the tube 56 to the end Y of the cylinder, and the passage to the end X is closed. A second air-pressure impulse from the tube 59 will then cause a return movement of the piston toward the end X of the cylinder, and the arm and gear-segment will be moved back to the initial position thereof and the shutter closed. As the arm 29 returns to the first position a lug 72 thereon engages an arm 73 on the tubular shaft and returns the shaft to its normal position, or with the collar 65 engaging the end of the bearing 57.

Referring now to the normal form of the shutter wings, as shown in Figs. 1, 9 and 10, it will be noted that the same have curvilinear outlines which include an inner end arc b concentric with the arbor, an outer end arc a concentric with the arbor and of a radius such as to extend from the arbor slightly beyond the center of the aperture, and side portions formed by a compound curve having a convex portion c adjoining the outer end arc a, and a concave portion d adjoining the inner end arc b. The arc b is tangent to the aperture, and the curve portion d has the same radius as the aperture. The shutter wings in passing the aperture overlap each other as shown in Fig. 9, so as to effectually close the aperture against the passage of light. As the wings move from the positions shown in Fig. 9, in the directions indicated by arrows, an opening is formed coincident with the center of the aperture, said opening at first having four equal sides slightly concave. The form of the opening at several successive positions is indicated by dotted lines in Fig. 10. By reference to said figure it will be seen that the opening is at all times symmetrical, and that the axes of symmetry remain practically constant, revolving slightly upon the center of the aperture as the wings approach the positions shown in Fig. 10, at which the aperture is fully open. It will also be seen that the aperture is fully open during more than half of the movement of the wings, and that the successive forms of the opening during the movement of closure will be the same as during the movement of opening, but with the axes of symmetry slightly different.

In Fig. 11 is shown a modified form of the shutter wings, 74. The said wings may be conceived as being produced by spreading or widening the wings 28 peripherally, or as by lengthening the outer end arc a and correspondingly shortening the inner end arc b, without changing the side curves c and d. The form of opening produced by said wings 74, during the movements of opening and closure, is the same as that produced by the normal wings 28, but the duration of the opening is less for the same speed of movement. The advantages of this form of wings is that at all times the adjacent edges of the wings overlap each other and there is, consequently, no possibility of the edges of the wings striking against each other should they be slightly bent or deflected from their normal planes of movement.

For some purposes it may be desirable to alter the character of the opening produced by the shutter, so that the passage of light through all parts of the aperture may be uniform instead of being more prolonged at the central part of the aperture than at the peripheral part thereof. This effect of uniform illumination over the entire aperture area may be effected by the construction shown in Figs. 12 and 13, wherein the alternate wings revolve in opposite directions. In said structure the pinions 75 on two of the wing-arbors do not mesh directly with the annular gear 25, being offset therefrom longitudinally of the arbors, as shown in Fig. 13. Said pinions 75 mesh with intermediate pinions 76 and the latter mesh with the annular gear, so that the arbors and wings driven by said pinions 75 revolve in opposite directions from the wings and arbors driven by the ordinary pinions 27 which mesh directly with the annular gear.

Wings 77, of the form shown in Figs. 14 and 15, are preferably used in connection with the reverse-motion actuating mechanism. Said wings 77 differ slightly in form from the normal wings 28, the outer and inner end arcs a and b, and at one side the arcs c and d, being identical. At the other side, however, the arcs c' are such that when the wings are in the closed position shown in Fig. 14 said arcs are concentric with the aperture, and the arcs d' are of smaller radius than the corresponding arcs d of the normal wings. The positions of the wings when partly closed is shown by the dotted lines in Fig. 15, from which it will be apparent that the opening of the aperture begins along opposite edges thereof and that the closure begins along the same edges. It will also be apparent that the completion of the opening and closure occurs along the edges which are at right angles to the edges at which the opening and closure begin.

Now, having described my invention, what I claim and desire to secure by Letters Patent is:

1. In a camera shutter, shutter wings, a pivoted member, means connecting the wings and said member, a piston for actuating said member, a source of pneumatic pressure, and means for directing said pressure onto either end of the piston.

2. In a camera shutter, a wing-actuating member, a spring for moving said member in one direction, a cylinder, a piston movable therein and connected with said actuating member, and means for simultaneously varying the tension of the spring and varying the effective area of a vent from said cylinder.

3. In a camera shutter mechanism, a shutter-actuating member, a spring and a piston each independently connected with said member, a cylinder inclosing the piston, means for varying the tension of the spring, means actuated by said varying means for limiting movement of the member, means actuated by said varying means for opening and closing a vent to one end of the cylinder, and means actuated by the limiting means for controlling admission of air to the cylinder.

4. In a mechanism of the class described, an arm mounted to swing each way from a vertical position, said arm having a longitudinal slot therein, a pin movable horizontally and extending into the slot in the arm, a spring connected with the arm, a shoulder at one side of the slot in the arm and engageable with the pin to retain the arm in a fixed position in opposition to the spring, and means for moving the pin to disengage it from the shoulder.

5. In a camera shutter, a wing-actuating member, a spring connected therewith, an air cylinder, a piston slidable therein, means connecting the piston and wing-actuating member whereby the movements of said parts are coördinated, means adapting said connecting means to retain the parts in a fixed position in opposition to the spring, means for releasing said retaining means, and means for simultaneously varying the tension of the spring and the area of a vent for one end of the air cylinder.

6. In a camera shutter, shutter wings, an oscillating member connected therewith, a spring connected with said member, means for retaining the member in a fixed position in opposition to said spring, means for releasing said retaining means, means for retarding movement of said member, means for varying the amount of retardation and the tension of the spring, and means actuated by the tension-varying means for limiting movement of the oscillating member when the tension of the spring has been reduced beyond a predetermined minimum.

7. In a camera shutter, a wing-actuating member, a spring connected therewith, a cylinder, a piston movable therein, means connecting the piston and the actuating member, means for retarding movement of the piston, means for varying the tension of the spring, and means controlling both the retarding and tension-varying means, whereby adjustments thereof are made simultaneously.

8. In a camera shutter, wings revoluble about fixed axes to open and close an aperture, means for actuating the wings to open and close the aperture by unidirectional movement thereof, means for actuating the wings to open the aperture by movement of the wings in one direction and to close the aperture by movement thereof in the other direction, and means for operatively connecting the wings with each of said actuating means.

9. In a camera shutter, shutter wings, a reciprocating part connected therewith, a cylinder having closed ends, a piston slidable within the cylinder and connected with the reciprocating part so as to actuate the same, means forming passages from a fluid-pressure supply to each end of the cylinder, and means controlling said passages and controlled by the reciprocating part, whereby movement of said part in either direction will open one of said passages and close the other.

In testimony whereof I have hereunto subscribed my name in the presence of two witnesses.

WILL R. SAVAGE.

Witnesses:
D. O. BARNELL,
M. S. WALKER.